Patented Apr. 6, 1943

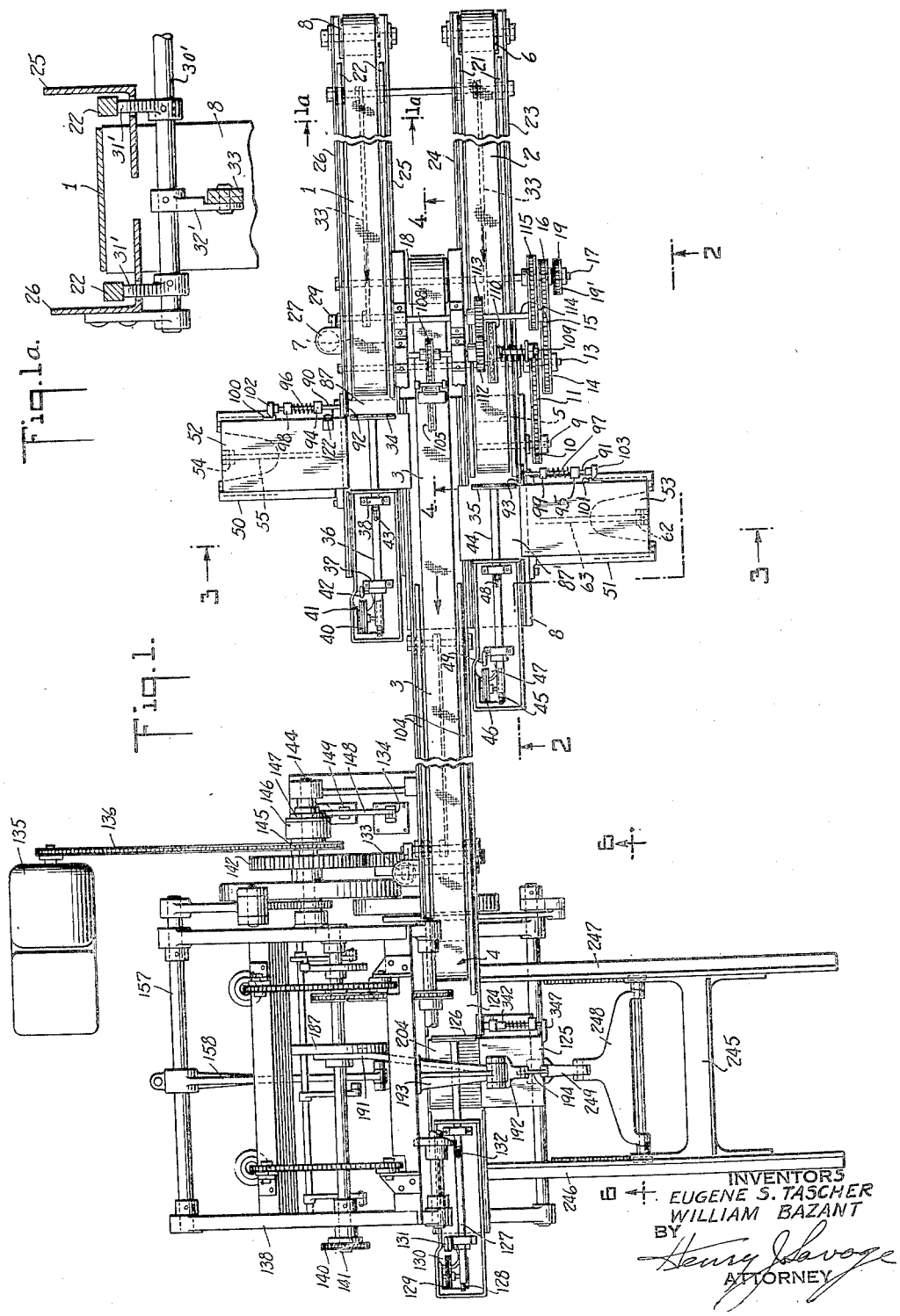

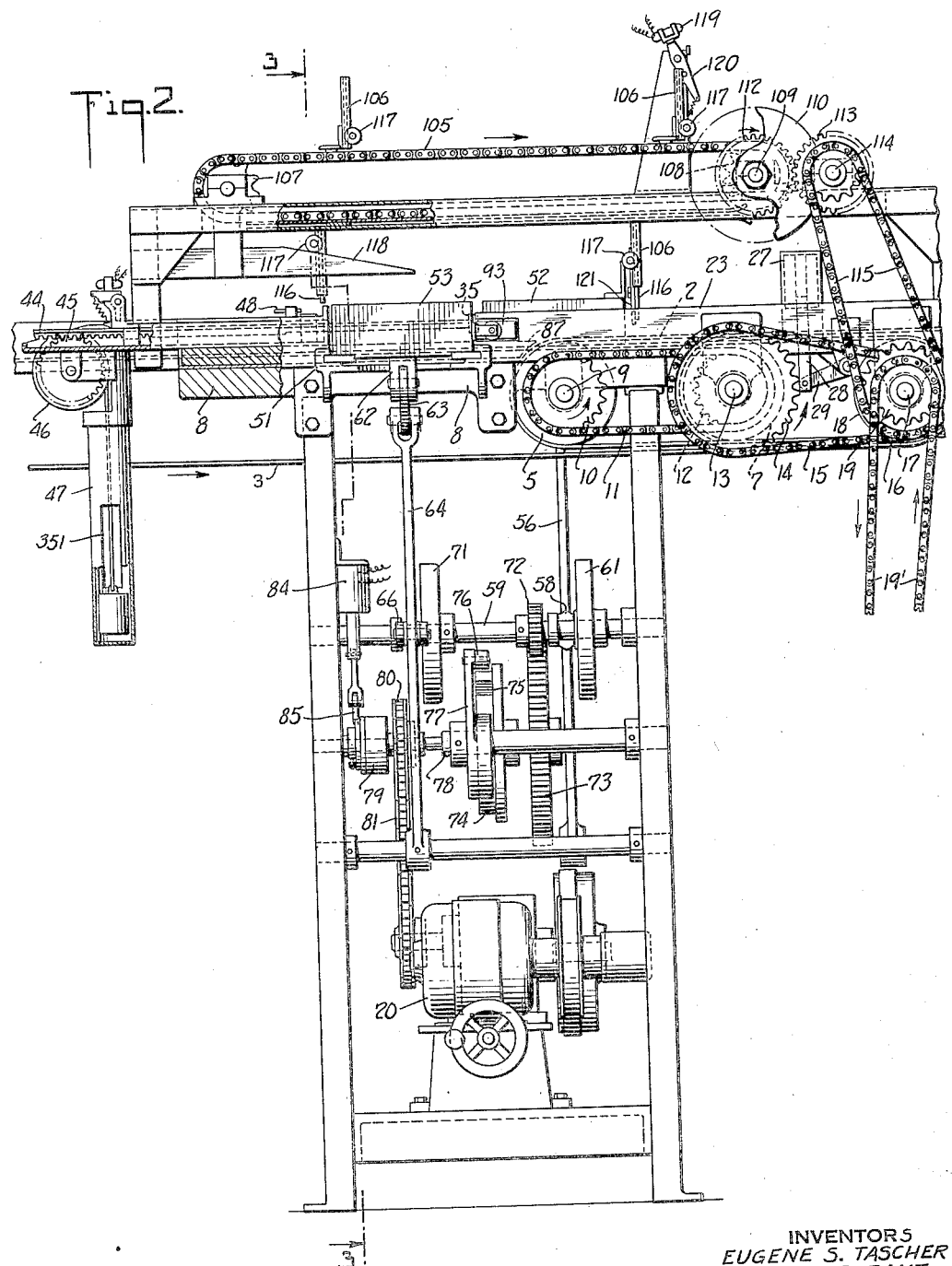

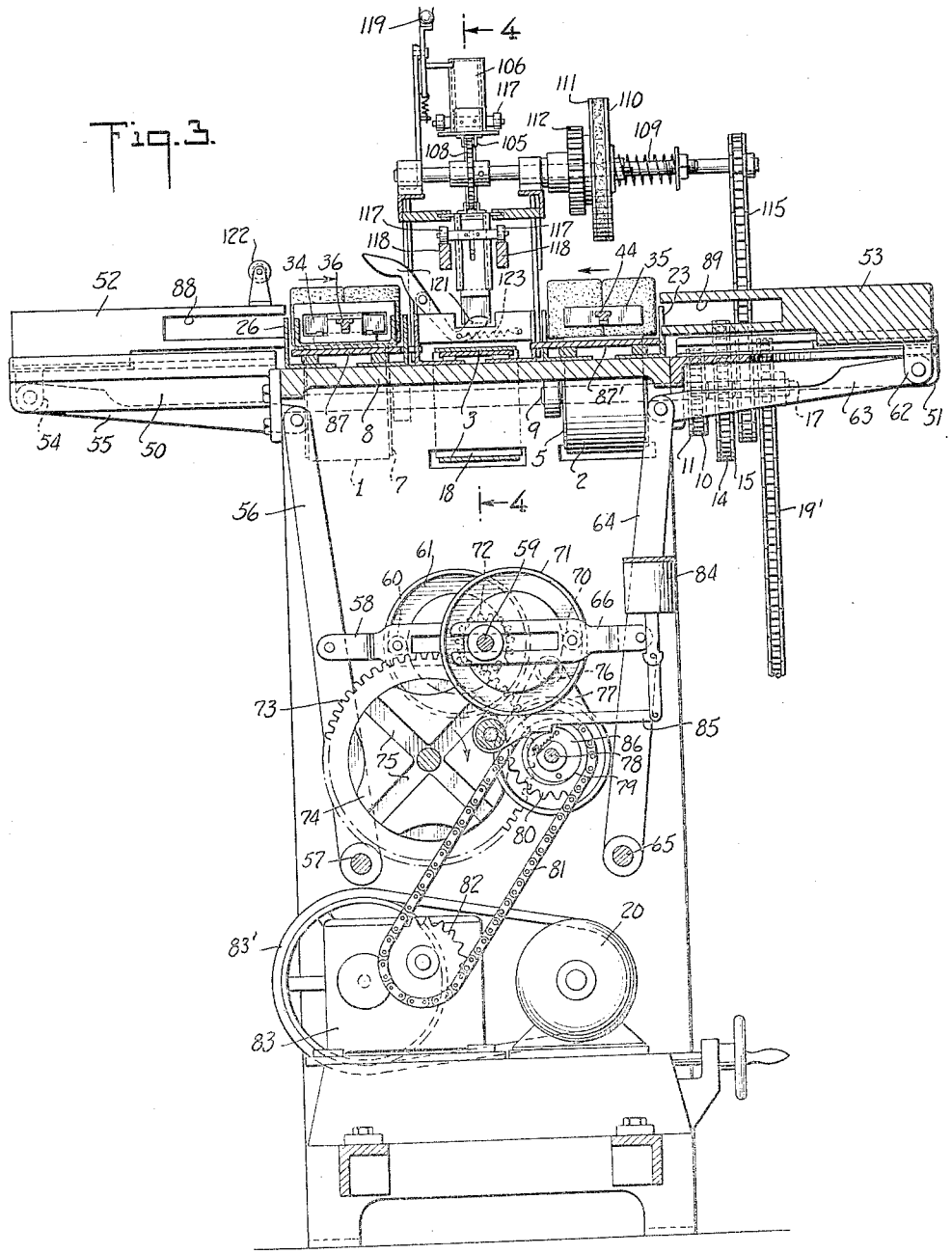

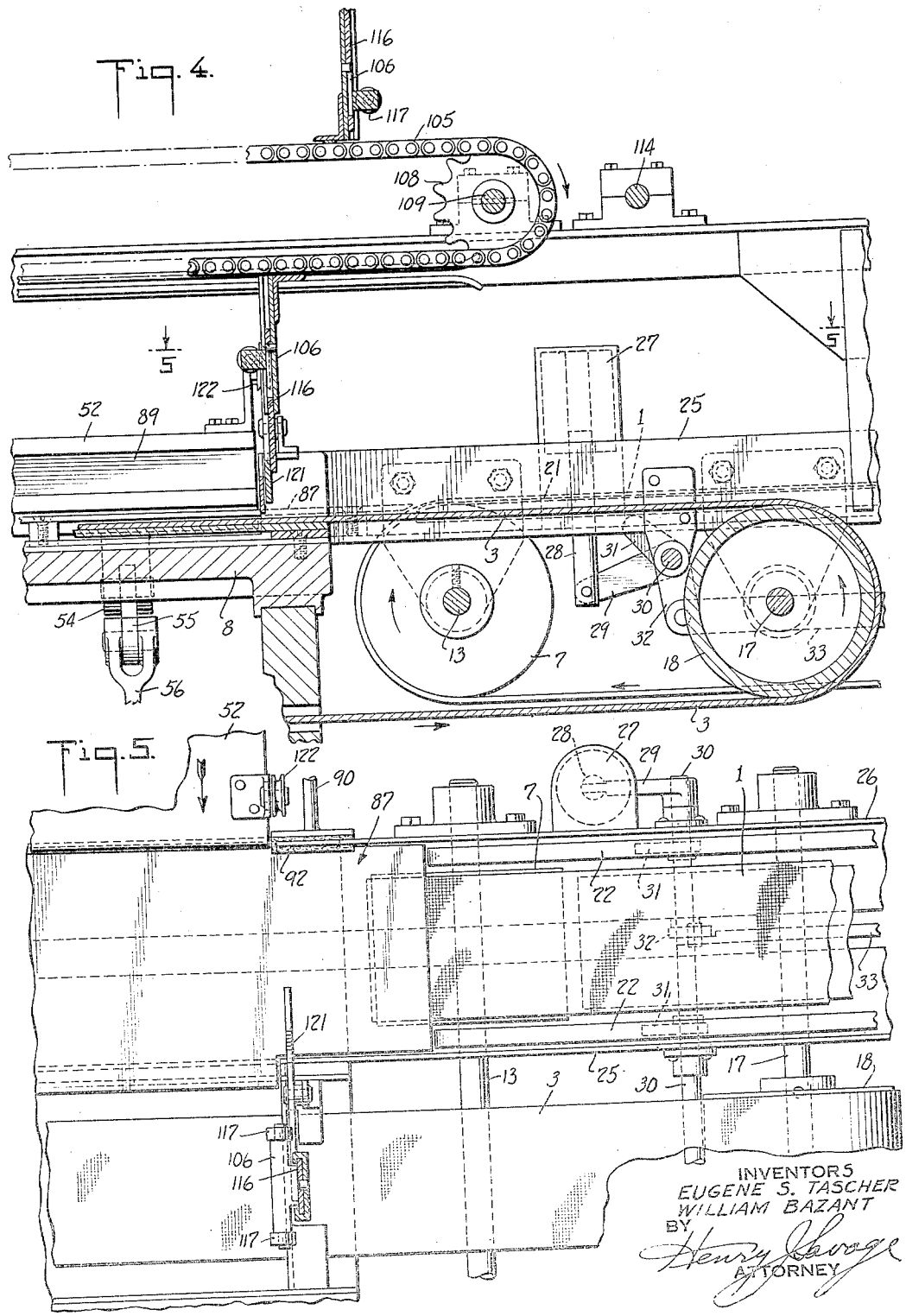

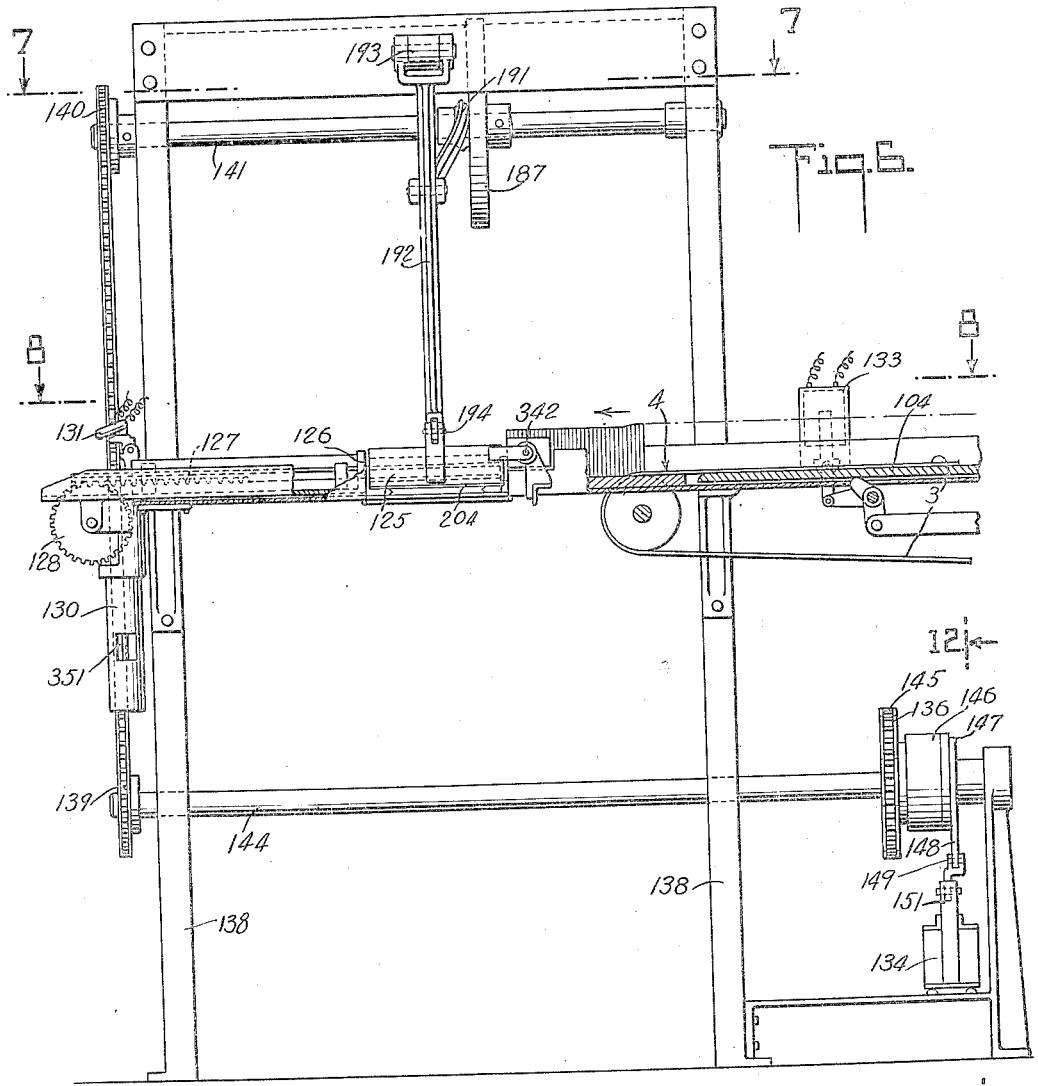
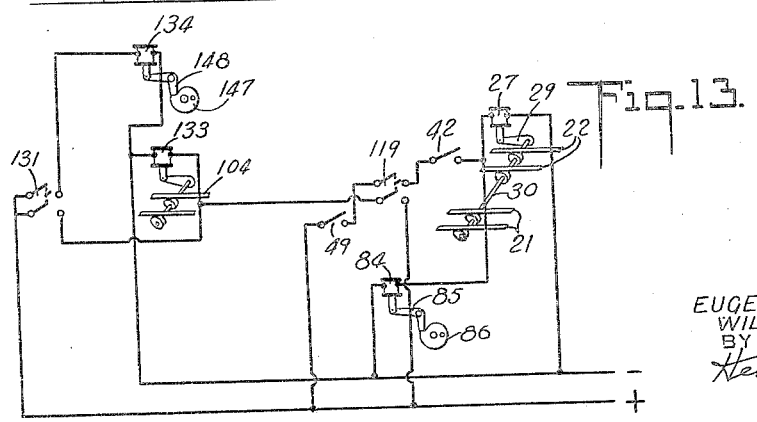

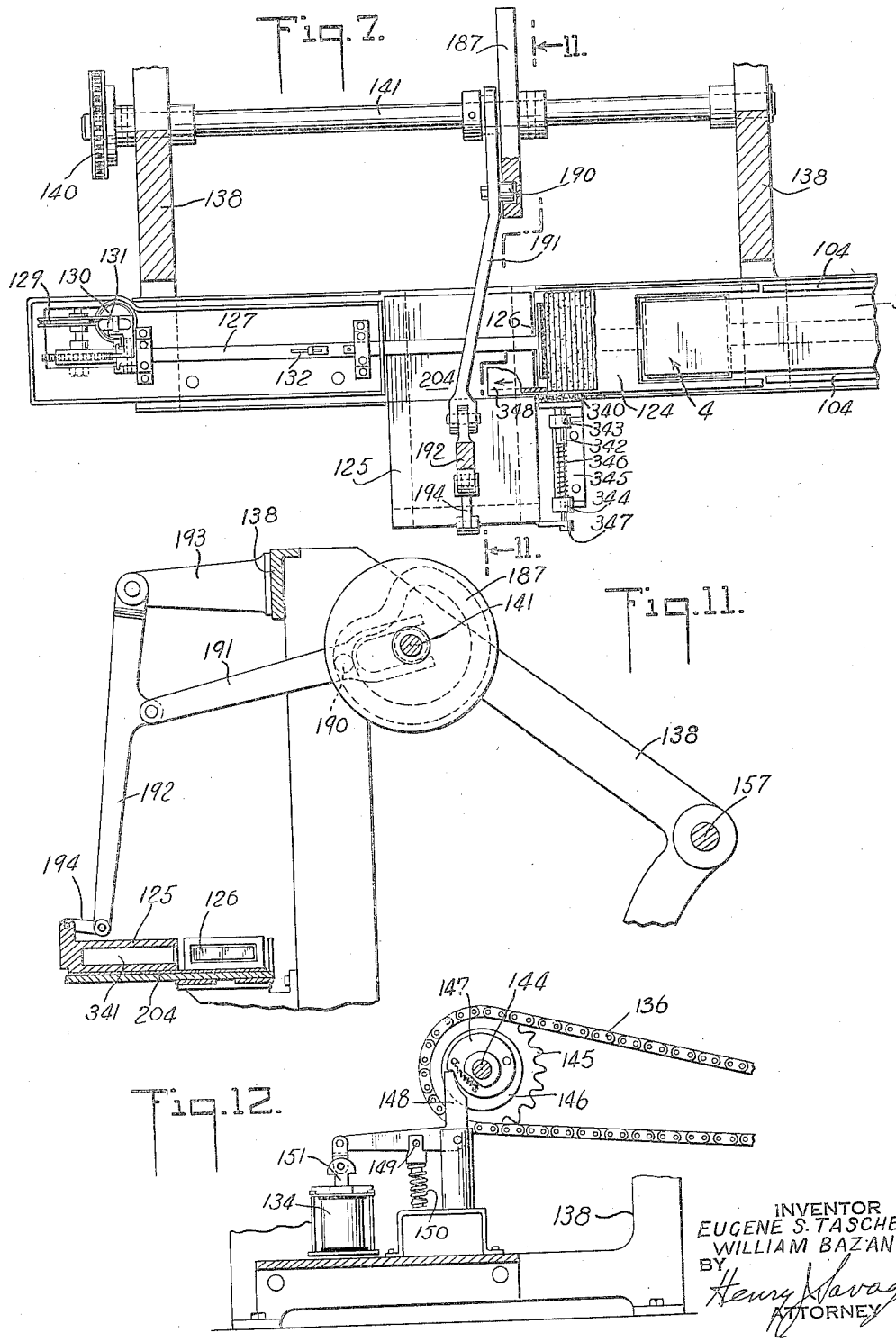

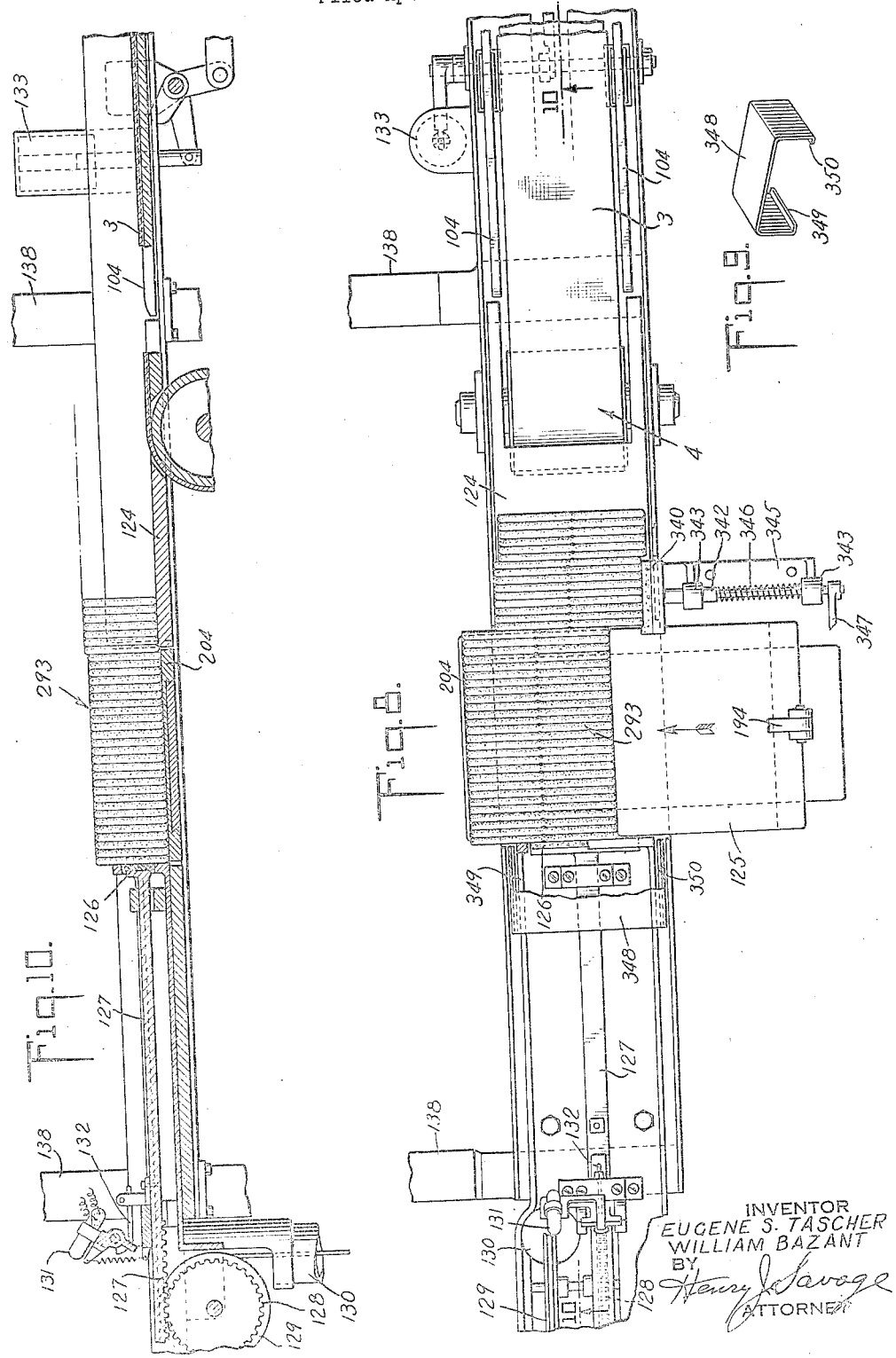

2,315,670

UNITED STATES PATENT OFFICE 2,315,670

CONVEYING AND DELIVERY MECHANISM

Eugene S. Tascher, Ingleside, Ill., and William Bazant, Wyandanch, N. Y., assignors to National Biscuit Company, New York, N. Y., a corporation of New Jersey Application April 17, 1940, Serial No. 330,140

21 Claims. (Cl. 198—32)

Our invention pertains to conveying and delivery mechanism.

One of the principal objects of the invention is to provide a conveying and delivery mechanism wherein the articles being conveyed and delivered automatically control the feed and timing of the machine.

Another object of the invention is to provide means in a conveying and delivering machine that will measure by volume and with exactness the weight or unit quantity of the articles that will be delivered.

Another object is to provide a feeding and control means whereby an exact predetermined volume (and hence weight) of the articles will be delivered each time from the conveyor, the means being arranged so that it cannot operate until that exact volume is ready to be delivered.

Another object is to provide means for adjusting the volume measuring means so that the exact required volume will be measured and delivered each time.

Another object is to provide means whereby one or more continuously driven conveyors will receive the articles continuously at one end and at the other end, deliver them intermittently in measured quantities.

Another object is to provide means whereby articles being carried by two, or a multiple of two, continuously driven conveyors will be delivered intermittently and simultaneously from the two conveyors in measured quantities to form a single row of articles on a single continuously driven conveyor, which in turn, delivers the articles intermittently in measured quantities from its delivery end.

Another object is to provide in a single machine a means for continuously receiving articles to be packed, (as crackers or biscuit) and arrange them in a single stack or row of the width of the carton in which they are to be packed, means for advancing the single row or stack, means for intermittently and automatically measuring and delivering definite unit quantities of the articles from the leading end of the stack, each unit quantity being of such size as to fill a commercially practicable package.

Another object of our invention is to provide means operating in combination with an endless conveyor, driven continuously at uniform speed, whereby crackers or other products carried by the conveyor will be advanced intermittently and will be lifted out of contact with the moving conveyor during their intervals of rest.

Still another object is to provide a pair, or a multiple of pairs, of parallel endless conveyors driven continuously at uniform speed each carrying a stacked row of crackers that are advanced intermittently, in combination with means that will transfer a measured quantity of crackers, while the stacks of crackers are at rest, from each conveyor to a single continuously driven conveyor that moves at double the speed of the pair of conveyors.

The above and many other objects and advantages over prior conveying and delivering machines are attained by our invention, one embodiment of which we have illustrated in the accompanying drawings wherein:

Fig. 1 is a plan view of one form of our invention showing how it may be used to deliver unit quantities of crackers to a cracker packaging machine.

Fig. 1—a is a detail sectional view on line 1a—1a of Fig. 1.

Fig. 2 is a side elevation, partly in section on the line 2—2, of Fig. 1, of the receiving end of the machine.

Fig. 3 is a section taken substantially on the line 3—3 of Figs. 1 and 2.

Fig. 4 is an enlarged sectional view taken substantially on the line 4—4 of Figs. 1 and 3 showing details of the pusher chain and solenoid for raising the elevator bars or rails.

Fig. 5 is a section taken substantially on the line 5—5 of Fig. 4.

Fig. 6 is a side elevation, partly in section on the line 6—6 of Fig. 1, the carton forming mechanism being omitted.

Fig. 7 is a view taken substantially on the line 7—7 of Fig. 6.

Fig. 8 is a section taken on the line 8—8 of Fig. 6.

Fig. 9 shows a leader or starting block, one of which is used at the head of each stack of crackers when the machine is first set in operation.

Fig. 10 is a section on the line 10—10 of Fig. 8.

Fig. 11 is a detail view of the pusher operating mechanism.

Fig. 12 is a detail of the solenoid and clutch control for the pusher.

Fig. 13 is a diagram of the wiring for controlling the solenoids for operating the cracker elevator bars and clutches.

We have illustrated our invention as embodied in a machine for conveying biscuit or crackers such for example as the well-known Uneeda biscuit and graham crackers, both of which are baked in sheets, as distinguished from "cut-out" or "dropped" biscuit, but this is for purposes of illustration only and it is to be understood that the invention may be used for handling many articles of merchandise and substantially all varieties of biscuit and crackers.

In modern bakeries, sheet goods, for which the form of the invention illustrated is specifically designed, are baked on band ovens which deliver a continuous baked sheet, thirty inches or more in width, that is scored or cut both longitudinally and transversely so that it may be broken along these cuts to form biscuit or crackers of the proper size.

As this baked sheet is delivered from the oven, it usually is broken along the transverse cuts so as to form strips of crackers the width of which equals one dimension of the crackers and the length of which is equal to the width of the sheet. Each of these strips may contain from 10 to 20 crackers, joined end to end along cuts or weakened lines. These strips must then be broken crosswise to separate the individual crackers. In the case of graham crackers, they usually are broken only to form units of one or two crackers each. These separate units must then be stacked and placed in the cartons, and heretofore the general practice has been to do this by hand.

According to our entire invention of which the present invention is a part, after the baked sheet of crackers is broken either by hand or by machine into individual crackers, or short units of two or more crackers each, the crackers or units are handled entirely automatically through all operations of stacking, alining, feeding, measuring, filling, forming and closing until they emerge in closed cartons, each containing an exact volume and weight of crackers and without being touched or handled by human hands.

When the articles being packed are graham crackers, as shown in the drawings, they are about 2⅝ inches square, and if the sheet of dough from which they are baked is sixteen crackers wide, then when the baked sheet is broken into units of two crackers each, there will be eight parallel rows of these units as they come from the breakers. These multiple rows of units (which we will refer to hereinafter as crackers, whether consisting of one, two or more crackers) with the crackers standing on edge are delivered to the receiving end of our invention where they are united to form a single row. From the leading or forward end of this row, measured quantities of the biscuit of a volume and weight sufficient to fill a carton are intermittently measured off and fed to a suitable carton filling machine.

Referring first to Fig. 1, the right hand end of the machine is the receiving end which receives the crackers or other articles to be packed and the left hand end is the end of the machine where the crackers are delivered in measured quantities.

We will first describe the receiving end of the machine where two rows of crackers stacked on edge are received and combined into a single row traveling at twice the speed of the two rows.

Each of a pair of endless belts or conveyors 1 and 2, which are driven continuously at uniform speed, receives a supply of crackers stacked on edge as they come in units of two (in the case of graham crackers) from the machines which break them from the continuous sheet, or from operators if they are broken apart by hand.

These two conveyors 1 and 2 deliver their crackers stacked on edge to a conveyor 3 which is driven continuously at twice the speed of the conveyors 1 and 2 and at its delivery end 4 delivers the crackers intermittently in measured quantities.

The mechanism for transferring the crackers from the two continuously moving conveyors 1 and 2 to the single continuously moving conveyor 3 is best illustrated in Figs. 1 to 5. The conveyor or belt 2 passes around pulleys 5 and 6 at its opposite ends and the conveyor 1 passes around similar pulleys 7 and 8. The pulleys 5 and 7 are the driving pulleys.

As best shown in Figs. 1 to 4, the pulleys 5 and 7 are keyed to short shafts which are journaled in bearings on the under side of a bed plate 8. The shaft 9 of the pulley 5 extends beyond the bed plate and carries a sprocket 10 that is engaged by a chain 11 that also passes around the sprocket 12 keyed to the shaft 13 of the pulley 7, the sprockets 10 and 12 being the same size. The shaft 13 also carries a sprocket 14 which is engaged by a chain 15 passing around a sprocket 16 that is one-half the size of the sprocket 14. The sprocket 16 is keyed to a shaft 17 that is fixed to the pulley 18 by which the conveyor 3 is driven. It will thus be seen that the pulley 18 runs at twice the speed of the pulleys 5 and 7 and correspondingly drives the conveyor 3 faster. The shaft 17 also carries a driving sprocket 19 that is engaged by chain 19' driven from any suitable source of power which may be the motor 20 or an independent motor.

The problem involved in this part of the mechanism is to convey the crackers laterally from the continuously driven belts 1 and 2 onto the continuously driven belt 3 without changing the speed of any of these belts and without rubbing the edges of the crackers or otherwise injuring them. We accomplish this by intermittently, yet simultaneously, delivering measured quantities of the crackers from the stacks on the conveyors 1 and 2 to the conveyor 3 without in any way affecting the speed of any of the conveyors, yet holding the columns or stacks of crackers stationary during the intervals when these transfers are being made.

As best shown in Fig. 1, the belts 1 and 2 run between pairs of lifter bars 21, 22 which bars normally are below the surface of the upper runs of the belts but which are adapted to be raised higher than the belts. The width of the belts 1 and 2 is less than the length of the two crackers or other articles to be packed so that the ends of the crackers or articles overlie the depressed pairs of rails 21, 22. Outside the bars 21 and 22 are vertical flanges 23, 24, 25, 26 which provide troughs to guide the ends of the crackers and keep them accurately in alignment.

When it is desired to stop the movement of the stacks of crackers so as to move a measured quantity laterally from the head of each stack, these bars or rails 21, 22 are elevated so as to lift the crackers free from the belts 1 and 2 which continue to run at their normal uniform speed.

Referring now to Figs. 1—a, 4 and 5 these bars are raised and lowered by a linkage of cams and levers controlled by a solenoid 27. The core 28 of this solenoid is connected to a lever 29 that is fixed to a shaft 30 that extends across the machine and has a cam or lifting finger 31 under each of the bars 21, 22. Intermediate its ends this shaft 30 carries a fixed arm 32 that is connected to a link 33 that extends to the opposite ends of the bars 21 and 22 where it is connected to another lever 32' similar to the lever 32 on a shaft 30' that carries cams or fingers 31' for simultaneously raising the right hand ends (Fig. 1) of the bars 21, 22. This solenoid 27 is energized in timed relation with the delivery of the crackers from the leading ends of the stacks on the belts 1 and 2.

Referring to Fig. 1, it will be seen that there is a sliding follower 34, 35 in alignment with each of the belts 1 and 2 and adapted to be engaged and pushed toward the left in this figure by the stacks of crackers as they are carried forward on the belts. The follower 34 is fixed to one end of a rack 36 which is slidably mounted in guides 37, 38 on the bed plate 8. On its under-surface this rack is provided with teeth that engage a pinion that is fixed to a short shaft carrying a grooved pulley 40 to which one end of a cord is attached that has a weight adapted to rise and fall in the well 41. Adjacent the guide 37 is a mercury switch 42 which is one of three switches that are connected in series in the circuit of the solenoid 27. The rack bar 36 carries an adjustable striker 43 which strikes and tilts the mercury switch 42 to close the circuit through it when the rack bar and follower 34 are at the extreme left end of their travel. Similarly the follower 35 has a rack bar 44 engaging a pinion 45 mounted on a shaft fixed to the grooved pulley 46 to which is attached one end of a cord carrying a weight adapted to move up and down in the well 47. A striker 48 on the rack bar 44 is adapted to strike the mercury switch 49 and tilt it so as to close the circuit through the switch when the follower 35 is at its extreme left hand position (Fig. 1). The switch 49 is in series with the switch 42 in the circuit of the solenoid 27.

Referring to Figs. 1 and 3, there is a bracket 50, 51 secured to each side of the bed plate 8 adjacent to the two followers 34, 35. These two brackets form guides for a pair of plungers 52, 53 which operate simultaneously in timed relation to deliver the crackers laterally from the conveyors 1 and 2 to the conveyor 3. Each of these plungers is adapted to slide in its bracket or support 50, 51. Referring particularly to Fig. 3, the plunger 52 has a lug 54 to which one end of a link 55 is pivoted, the other end of the link being connected to the upper end of lever 56, the lower end of which is pivoted at 57 to the fixed frame of the machine. Intermediate its ends, the lever 56 is pivotly connected to a yoke 58 which straddles a shaft 59 and has a follower 60 that engages in the groove of a cam 61 that is keyed to and driven by the shaft 59.

Similarly the pusher 53 has a depending lug 62 connected to a link 63 which in turn is connected to the upper end of the lever 64, the lower end of which is pivoted at 65 to the frame of the machine. A yoke 66 is pivoted to the lever 64 and also straddles the shaft 59. It has a follower 70 engaging in the groove of a cam 71 which is likewise keyed to the shaft 59. The two cams 61 and 71 are keyed to the shaft 59 substantially 180 degrees apart so as to operate the two plungers at the same time.

The shaft 59 carries a pinion 72 that meshes with a gear 73 fixed on a shaft journaled in the frame of the machine and carrying one element 74 of a Geneva drive. The Geneva drive has four grooves 75 adapted to be engaged by a roller 76 on an arm 77 that is keyed to a clutch shaft 78. This clutch shaft 78 is driven by a one revolution clutch 79 which may be of standard construction. One element of this clutch is connected to a sprocket 80 and is driven continuously by the chain 81 which passes around a sprocket 82 connected to be driven through a variable speed drive 83 which in turn is driven by a belt or chain 83' from the motor 20 (Figs. 2 and 3).

Referring again to Fig. 2, the clutch 79 is released periodically, so as to cause the arm 77 of the Geneva drive to make one revolution, through a solenoid 84 which is in parallel with the solenoid 27 and its circuit is in series with the two mercury switches 42, 49. There is a third switch in the two solenoid circuits which must also be closed before either solenoid 27 or 84 is energized. When the solenoid 84 is energized, it raises the latch 85 (Fig. 3) so as to release the clutch dog 86 and permit the clutch to make one revolution. Almost immediately upon releasing the latch 85, the circuit through the solenoid 84 is broken so that the latch returns to its position as shown in Fig. 3 to engage and stop the clutch when it has completed one revolution.

One revolution of the clutch 79 causes the arm 77 of the Geneva drive to make one revolution and to turn the member 74 through 90°. The ratio of the gears 73, 72 is four to one so that the shaft 59 and cams 61, 71 make one complete revolution and the plungers 52, 53 move in and out across the line of the belts 1 and 2 to feed the crackers to the belt 3.

As shown in Fig. 1, the belts 1 and 2 stop short of the plungers 52, 53 and the followers 34, 35 so that the belts deliver the crackers standing on edge to transfer plates 87, 87' which are substantially in alignment with the upper run of the belts 1 and 2. The inner ends of the plungers 52, 53 have open sided recesses 88, 89 through which the followers 34, 35 may slide.

Assume now that the belts 1 and 2 are filled throughout their lengths with crackers that are being supplied continuously to their receiving ends and are stacked on edge with their ends extending over rails 21, 22. As the heads of the columns of crackers advance toward the left (Fig. 1) they engage the followers 34, 35 and push them to the left until the mercury switches 42, 49 are tipped to close the circuit through the solenoids 27 and 84 (together with the third switch presently to be described which is in series with the switches 42 and 49). When this happens the rails 21, 22 are lifted to raise the crackers from the belts 1 and 2. The columns of crackers are then stationary and the plungers 52, 53 move inward to push definite measured quantities of the crackers from the head of the two columns from the plates 87, 87' onto the belt 3. As the plungers 52 and 53 push the crackers inward, the followers 34, 35 are freed as soon as the stack of crackers clears them and they are then returned by the weights in the two wells 41, 47 until they contact the heads of the columns of crackers that were left standing on the raised rails 21, 22. Each of the guides 50, 51 has a cracker clamp yieldably and slidably mounted thereon as best shown in Fig. 1. Each of these clamps comprises a rod 90, 91 slidably mounted in bearings on the guides adjacent the respective plungers and at its inner end each has a sponge rubber or other yieldable head 92, 93 which engages the edges of the crackers that are left standing on the rails 21, 22 so as to prevent their falling over as the plungers 53, 52 are moved in and out. Each of these holders has a collar 94, 95 against which one end of a light coil spring 96, 97 abuts, the other end of the spring engaging the bearing 98, 99 through which the stems 90, 91 slide. Each of the plungers has a lug 100, 101 which is adapted to engage the head 102, 103 of the holders and withdraw them from the crackers when the plungers are retracted.

When the crackers are delivered by the plungers onto the belt 3, the rails 104 adjacent the edges of the belt 3 are raised so that the stack of crackers is stationary. The crackers are then carried along on the belt 3 in conjunction with the pusher mechanism that is best shown in Figs. 2 and 3. This pusher mechanism comprises a pusher chain 105 carrying a number of pushers 106 (in this case, four) which are operated in timed relation with the plungers 52, 53. The chain 105 passes over sprockets 107, 108 which are carried by an auxiliary frame that is supported above the table 8 and transfer plates 87, 87'. The sprocket 108 is the driven sprocket and it is fixed on a shaft 109 which has one element 110 of a slip clutch keyed to its outer end. The other element 111 of this slip clutch is rotatably mounted on the shaft 109 and has a gear 112 which meshes with a gear 113 keyed to a shaft 114 having a sprocket at its outer end that is driven by a chain 115 (Fig. 1) that passes around a sprocket keyed to the shaft 17 on which the driving drum for the belt 3 is secured. It will be seen that the element 111 of the slip clutch is driven continuously while the member 110, and consequently the pusher chain 105, is driven intermittently whenever the clutch element 110 is free to turn. Each of the pushers 106 comprises a fixed finger or lug which is secured to the chain 105 and a sliding finger or tongue 116 which is adapted to slide in and out in the lugs 106 to increase and decrease the effective lengths of the lugs. As best shown in Fig. 2, these fingers are free to slide in and out in the pushers 106. Looking at this figure, the upper run of the chain is running toward the right and the lower run toward the left. As shown on the top run of the chain, the slidable fingers 116 are housed entirely within the pushers 106 while on the lower run of the chain the finger is extended its maximum amount below the pusher 106 at the right and it extends only a very small amount below the pusher 106 at the left. Each of these fingers carries a pair of rollers 117 which are adapted to engage inclined tracks 118 up which the rollers ride to lift the fingers as they approach the left hand end of the chain. As the pushers go around the sprocket 107 so as to turn the fingers up, the latter slide down so that they are housed entirely within the pushers 106.

Mounted above the pusher chain is a pivoted mercury switch 119, the arm of which has a projecting pin or lug 120 that is adapted to be engaged by the pushers 105 as they pass it so as to tilt the switch 119 to close the circuit through it. This switch 119 is in series with the two switches 42, 49 previously described in the circuit of the two solenoids 27, 84. When all three of the switches are closed both circuits through the solenoids 27, 84 are closed to energize them as shown in the diagram of Fig. 20.

Referring now to Figs. 2, 3, 4 and 5 there is a pivoted stop 121, the inner end of which is in the path of the finger 116 as it projects below the pusher 106 on the lower run of the pusher chain. The pushers 106 are so arranged on the chain that when one of the fingers 116 strikes the stop 121, the next following pusher has just tilted the mercury switch 119 so as to close the circuit through it. When one of the fingers engages this stop, the pusher chain comes to rest which it can do by reason of the slip clutch 110, 111. The element 111 of this slip clutch is rotated continuously but the element 110 can rotate only when the stop 121 has been moved to release the finger 116.

When any one of the fingers 116 contacts the stop 121, the switch 119 is closed and this operation is so timed that this switch is closed just before or simultaneously with the switches 42, 49 so that all three of them will then be closed and the two solenoids 27, 84 energized. This sets the mechanism in operation to lift the rails 21, 22 and move the plungers 52, 53 in so that they will push the two measured quantities of crackers (one from each stack) between the fingers 116 which is against the stop and the next preceding finger 116 which has been partly raised by the tracks 118 and is still in contact with the stack of crackers on the rails 104 in front of it. As soon as the plungers 52, 53 push the crackers from in front of the followers 34, 35, the followers are returned toward the right (Fig. 1) which withdraws the strikers 43, 48 from the mercury switches 42, 49 and breaks the circuit through the two solenoids. At the same time that the plunger 52 advances on its in-stroke, a roller 122 which it carries contacts the upper end of the pivoted stop 121 (Fig. 3) and rocks it out of the path of the finger 116 so as to release the latter and permit the clutch 110, 111 to drive the pusher chain 105. At the same time, the rails 104 are released so as to lower the stack of crackers to the belt 3. The finger 116 now engaged behind the two stacks of crackers that were delivered by the pushers 52, 53 advances toward the left (Figs. 1 and 2) pushing the crackers ahead of it onto the belt 3 where they are carried toward the delivery end 4 from which they are delivered in measured quantities, as to a packaging machine. This forward motion of the pusher finger and feeding of the crackers continues until the finger reaches the position shown at the left hand side in Fig. 2 and the next following finger comes into contact with the stop 121. At the same time the second following pusher 106 contacts the switch 119 and closes the circuit through that, ready for another cycle as soon as the two switches 42, 49 are again closed. When the plunger 52 is retracted, the roller 122 releases the stop 121 which is returned into the path of the finger 116 by a spring 123 (Fig. 3).

Referring to Fig. 1 the conveyor 3 at its left end delivers the crackers to a transfer plate 124 in front of a plunger 125 that is similar to the plungers 52, 53, previously described and in alignment with a follower 126 which is similar to the followers 34, 35. The follower 126 is connected to a rack 127 which engages a pinion 128 that is secured to a grooved pulley 129 over which a cord passes that is attached at at one end to a weight adapted to rise and fall in the well 130. A mercury switch 131 (which is a double switch or two switches secured together) is adapted to be tilted and closed by striker 132 on the rack 127 when the follower 126 is at the extreme left end of its movement. One side of the switch 131 is in the circuit of a solenoid 133 (Figs. 1, 6 and 13) which through a system of levers and cams (as shown in Fig. 6) operates to lift the rails 104 when the solenoid 133 is energized in the same manner that the rails 21, 22 are lifted. The operation of this is apparent from Fig. 6 and need not be described in detail.

The solenoid 133 is also in circuit with the switch 119 which may be either a single switch having two sets of contacts or may be two separate switches, one in the circuit with the switches 42 and 49 and the other in a second circuit with the solenoid 133. It will thus be seen that the solenoid 133 will be energized and the rails 104 raised when either the switch 131 or 119 is closed. The switch 131 will be closed twice to each closing of the switch 119 and usually the closing of the switch 119 will coincide with alternate closings of the switch 131. The reason for this dual control of the solenoid 133 is that the rails 104 must be raised to stop the feeding of crackers by the belt 3 each time that the plunger 125 delivers a measured quantity of crackers and also the rails 104 must be raised each time that the pushers 106 come to rest and stop the pushing of the crackers along to the belt 3.

The operation of pusher 125 to feed measured quantities of the crackers from the forward end of the column is controlled through a solenoid 134 (Fig. 6) that in turn controls the operation of a one revolution clutch similar to the clutch 86 of Fig. 3. The solenoid 134 is in a circuit that is controlled by the switch 131 which like the switch 119 is a double switch or two independent switches, one in the circuit of the solenoid 133 and the other in the circuit of the solenoid 134. Therefore, each time that the follower 126 is pushed to the left (Fig. 1), the circuits through both of the solenoids 133, 134 will be closed which will cause the plunger 125 to feed a definite volume and therefore a definite weight of the crackers from the head of the column.

In Fig. 1 we have shown our invention as delivering to a packaging machine with which its greatest utility is attained. The packaging machine is illustrated only in part since per se it does not form part of the invention claimed in this application, but is shown, described and claimed in our copending application, Ser. No. 388,958. An electric motor 35, preferably having a built-in adjustable speed reduction drive, through a chain 136 drives a sprocket 145 that is fixed to one element 146 of the one-revolution clutch rotatable on a shaft 144 mounted in the lower part of the frame 138. The other element 147 of this clutch is keyed to the shaft 144 and normally engages the stop 148 which holds it against rotation. The stop 148 is pivoted at 149 and a spring 150 urges it into the path of the clutch element 147, (Fig. 12). The free end of the stop 148 is connected to the core 151 of the solenoid 134. When the solenoid 134 is energized, it pulls down on the stop 148, tilting it about the pivot 149 to release the clutch which then drives the shaft 144 one revolution.

The carton feeding and forming machine is supported on the frame 138 and comprises a pair of arms 246, 247 supporting a carton blank and liner feeding mechanism, including the feed carriage 245, link 248 and cam actuated arm 249. The frame also carries a rock shaft 157 to which is keyed the arm 158 that operates the carton folding, forming and closing mechanism, for a full disclosure of which reference is made to our co-pending application.

Returning now to the present invention, as best shown in Figs. 6 and 7, the shaft 144 carries a sprocket 139, which through a chain drives a sprocket 140 keyed to the cam shaft 141 to which is fixed a cam 187. The cam 187 has a race in which the roller 190 on sliding link 191 runs. The link 191 is forked at its end adjacent the cam and slidably engages the shaft 141. The opposite end of link 191 is pivotally connected to a swinging arm 192 intermediate its ends, the upper end of the arm being pivotally supported on a bracket 193 secured to the frame of the machine. The lower end of arm 192 is connected by a short link 194 to the plunger 125 that delivers the crackers from the head of the stack on belt 3. It will be noted on reference to Fig. 11, that the race in the cam 187 is concentric with the shaft 141 through about 240° and that the active portion of the race embraces only 120° or less, so that the action of the plunger 125 takes place during one third, or less than one third, of the time that the articles are being fed forwardly by the belt 3.

The plunger 125 has a forwardly extending plate 204 which is in alignment with the belt 3 when the plunger is withdrawn and receives the crackers from the head of the stack. This plate 204 supports the crackers as they are pushed out by the plunger 125.

As indicated in the wiring diagram (Fig. 13) each of the mercury switches 119, 131 is a double switch or two separate switches secured to operate together. The switch 119 controls the solenoid 133 independently of any other switch or circuit, and in conjunction with the two switches 42, 49 controls the circuits of the clutch solenoid 84 and the solenoid 27. Thus whenever the switch 119 is closed, the solenoid 133 will be energized and lift the rails 104 so as to lift the crackers free from conveyor 3 and bring them to rest. Then when switches 42 and 49 also are closed, the rails 21, 22 will be lifted and the pushers 52, 53 will push measured batches of crackers from the heads of the stacks on belts 1 and 2 onto belt 3. The solenoid 133 must operate with twice the frequency of the solenoids 27 and 84, so it also is connected in a circuit with the double switch 131, which operates with twice the frequency of the switches 119, 49 and 42. Usually one of each two closings of the switch 131 will coincide with a closing of switch 119, and the other closing will occur at half the interval between two closings of switch 119. But this timing need not be exact because the stack of crackers is sufficiently yieldable to compensate for very slight differences in timing, and since the crackers themselves are the actual timing means, the only variations in exact timing that can occur are due to variations in the crackers, and that variation is self compensating.

Each of the plungers 52, 53, 125 cooperates with a cracker clamp having a soft or yieldable head that engages the front crackers of the stacks and keeps them from falling over until the followers 34, 35, 126 are returned into engagement with the first cracker of each stack. These holders are of identical construction, those cooperating with the plungers 52, 53 being indicated by the numbers 92, 93 (Fig. 1) and that with plunger 125 being indicated by the number 340. The construction and operation of the clamp or holders are best shown in Figs. 6, 7, 8 and 10.

In Fig. 7, the plunger 125 is shown in retracted position just after it has delivered a measure of crackers from the belt 3, and the follower 126 is in contact with and holding the front crackers of the stack. In Figs. 8 and 10, the follower 126 has been pushed to the left by the advancing stack of crackers and has closed the switch 131. The plunger 125 has started on its in-stroke to deliver a measured batch of crackers 293, and the soft sponge-rubber head 340 of the holder or clamp is holding the front crackers so that they cannot tip over before the follower 126 is returned. On reference to Fig. 11, the pusher 125 has a slot 341 (like the slots 88, 89 in pushers

52, 53) through which the follower 126 returns just as soon as the batch of crackers 293 is pushed in far enough (Fig. 8) to clear the follower.

The soft head 340 of the holder is secured to a rod 342, slidable in guides 343, 344 on the fixed frame member 345. A light coil spring 346 bears at one end on the guide 344 and at the other end on the rod 342 so as to urge the holder toward the crackers. The outer end of the rod 342 has a finger 347 which projects into the path of the plunger 125 so that it will be struck by the plunger on its return stroke and the head 340 withdrawn from the crackers.

In Fig. 9, we shown a metal leader or starting block, 348 that is used at the head of each stack of crackers on the belts 1, 2 and 3 when starting up the machine. These starting blocks may be formed from sheet metal or cast and each is provided with two feet 349, 350 which will span the belts 1, 2 and 3 and rest on the rails 21, 22, 104. The blocks are hollow so that they will pass over, without touching, the followers 34, 35 and 126. One of the blocks, partly broken away, is shown in Figs. 7 and 8. When the machine is started up, one of these blocks is placed at the entrant end of each conveyor 1, 2, 3, where it is supported on the respective rails 21, 22, 104. As the stacks of crackers are advanced by the belts, the blocks are pushed ahead on the rails by the advancing stacks and keep the first crackers standing on edge until they reach and are held by the respective followers 34, 35, 126. The hollow starting blocks then pass over the followers and no longer function. They may be removed from the machine or left standing in their inactive positions (as shown in Fig. 8) until the machine is next started when they will again be placed in position to lead the stacks of crackers.

When the pushers 34, 35 and 126 are released and returned toward the front of the stacks of crackers, their motion will be very rapid caused by the drop of the weights in the wells 41, 47, 130. If this return movement is not checked, the followers will strike the crackers with sufficient force to break them. In order to check this return movement of the followers, the bottoms of the wells 41, 47 and 130 are closed so as to provide dash-pots for the falling weights as clearly shown in Figs. 2 and 6. However, as the weights drop the air must escape from these wells so each is provided with openings 351, which may be of any size or shape adapted for the purpose, through which the air can escape until the lower edge of the falling weights passes the lower edge of these openings after which the air must escape between the walls of the wells and the sides of the weights and will cushion the last part of the downward movement of the weights and cause the followers to contact the crackers gently. The contact pins or strikers 43, 48 and 132 are adjustable with respect to the followers 34, 35 and 126, so that the timing of the machine may be adjusted to enable the plungers 52, 53 and 125 always to push exactly the necessary volume of crackers from the heads of the stacks on the conveyors 1, 2 and 3. These pins may be adjusted in any manner as by the clamp shown holding the pin 132 in Fig. 10.

As shown in Fig. 2 the distance between two adjacent pusher fingers 116 is just sufficient to permit two stacks of crackers to be pushed in between them by the plungers 52, 53. These pusher fingers are at rest when the crackers are pushed in which automatically releases the stop 75 121 so that the rear finger 116 (at the right Fig. 2) now advances pushing the crackers ahead of it on the belt 3. This rear finger 116 is down its maximum length in the pusher 106 so that it extends well below the center of the crackers. As it approaches the inclined track 118 at the left, the rollers 117 ride up on these tracks which lifts the finger 116 parallel to the rear face of the crackers but it extends down far enough to engage the top of the crackers as shown at the left of Fig. 2 at the time that the pusher again comes to rest. This finger extending down a short distance keeps the rear crackers of the stack from tilting backwards until the next operation of the plungers delivers two more batches of crackers into the space between this forward finger and the next following finger 116. The purpose in having the inclined track 118 to lift the fingers 116 is to have the fingers 116 moving vertically when they leave the stack of crackers and not to be traveling a curved path as they do around the sprocket 107 which would tip the crackers over if the fingers 116 were in contact with them at that time.

Referring to Fig. 1, it will be noted that the conveyor 2 is longer than the conveyor 1 and that its delivery end extends further forward. This is so that the stacks of crackers delivered from the transfer plates 87, 87' will not interfere when they are pushed simultaneously onto the belt 3 and between the pusher fingers. It will also be noted that the conveyor 3 extends to the right between the conveyors 1 and 2 and that the crackers are delivered from the transfer plates 87, 87' directly onto the belt 3. The rails 104 do not extend the full length of the belt 3 but end just short of where the crackers are delivered to the belt by the pusher 53. If it is thought desirable, the transfer plates 87 and 87' may be extended over that portion of the belt 3 that is at the right of the rails 104 and directly under the pusher chain 105 but we have found that not to be necessary, although in some cases desirable, because the pushers 52, 53 are operated so rapidly that there is no appreciable rubbing of the belt 3 on the crackers when they are pushed in from the delivery ends of the belts 1 and 2, but this is not the case with slow operating machines. The inward movement of the plunger 52 releases the latch 121 which holds the pusher so that it is in motion to support and push the rear end of the stack of crackers as soon as it is delivered between the two pusher fingers. The speed of the pusher fingers is double the speed of the conveyors 1 and 2 and therefore equal to the speed of the conveyor 3. When the pusher again comes to rest by striking the stop 121, the circuits have been closed so that the solenoid 133 is energized to lift the rails 104 so that the crackers are advanced by the belt 3 only when the pusher also is in operation.

The solenoids 133 and 134 are energized twice as frequently as the solenoid 127 and the plunger 125 makes twice as many reciprocations as the plungers 52, 53. One energization of the solenoids 133 and 134 and the lifting of the rails 104 coincides with the stopping of the pusher 105 and the other energization of the solenoids 133 and 134 occurs when the pusher is half way through its movement. At this time the head of the stack of crackers on the conveyor 3 is brought to rest and is held by the clamp 340 (Fig. 8) while the plunger 125 is pushing forward a measure of crackers 293 and returning to receiving position. During this interval, the pusher is still carrying the crackers along on the rails 104 so that there is a very slight pressing together of the crackers during that time but this is permissible because the operation of the plunger 125 is so rapid that the pressure on the crackers barely has time to take up the slack that necessarily exists between them and no appreciable pressure is developed.

In the operation of the machine, the switches are closed to start the motors 20 and 135 and also the motor for driving the chain 19' (Fig. 2) if a separate motor be used for that drive. Three of the starting blocks 348 are now set in position over the conveyors 1, 2 and 3, the block for conveyor 1 being supported on the right hand end of the rails 22 (Fig. 1) and another block being similarly supported on the right hand end of the rails 21. The third block is placed so that it partly overlaps the right hand ends of the rails 104, with the right hand edge of the block being substantially in alignment with the left hand edge of the plunger 53 (Fig. 1).

Crackers are now supplied in units of two standing on edge to the right hand end of the belts 1 and 2. These are carried toward the left by the belts, pushing the starting blocks in front of them, until the starting blocks have passed over the heads of the followers 34, 35 and the crackers engage these followers and push them to the left until the contacts 43, 48 close the two switches 42, 47. Previously to this, one of the pushers 106 had closed the switch 119 (Fig. 2). The closing of these three switches energizes the coils of the solenoids 27, and 84 and also the solenoid 133. These then operate to lift the rails 21, 22 and 104 which lifts the stacks of crackers free from the belts 1, 2 and 3, so that the latter do not rub the bottom edges of the crackers. The solenoid 84 releases the clutch 86 and the two plungers 52, 53 are now forced inward toward the belt 3 pushing measured quantities of the crackers from the belts 1 and 2 onto the belt 3. At the time the plungers start their inward movement, the soft heads of the holders 92, 93 engage the edges of the front crackers in the stacks that are left on the rails over the belts 1 and 2. As soon as the crackers are pushed in far enough to clear the followers 34, 35, the weights operating in the wells 41, 47 return the followers through the slots in the plungers again into contact with the leading crackers in the two stacks. When the plunger 52 gets very nearly to the end of its in-stroke, the roller 122 strikes the end of the stop 121 and releases it from engagement with the sliding finger 116 in one of the pushers. The friction clutch 110 now drives the shaft 109 and through the sprocket 108 drives the chain 105 that carries the pushers 106. As shown in Fig. 2 the two batches of crackers that are pushed onto the belt 3 by the plungers 52, 53 are just to the left of the finger 116 that is attached to the pusher chain. With the chain now being driven by the friction clutch in the direction indicated by the arrows (Fig. 2) the two stacks of crackers that were fed onto the belt 3 will be carried along by the belt and the finger 116 will keep the rear crackers from tipping over. When the chain 105 started to move, it opened the switch 119 which is in the circuit of the solenoid 133 so that the rails 104 were lowered and the crackers in the line of the belt 3 are supported entirely on the belt. As these crackers are carried forward by the belt 3, the starting block that was placed over this belt will support their forward end.

The plungers 52, 53 are immediately retracted and of course when the followers 34, 35 started their return movement toward the forward ends of the stacks of crackers, the switches 42, 49 were opened which de-energized the solenoid 27 and lowered the rails 21, 22 so that the two stacks of crackers will again be carried forward by the belts 1 and 2. This operation is repeated until the head of the stack of crackers on the belt 3 reaches and presses the follower 126 to the left in Fig. 1 so as to close the switch 131. When this occurs the leading end of the stack of crackers is substantially in alignment with the left hand edge of the plunger 125. The striker 132 on the follower is adjustable (Fig. 10) so that the volume of the crackers 293 may be varied to produce the exact weight or count that is required, but the leading edge of the stack never extends beyond the left hand edge of the plunger 125. The switch 131 as previously described, is either two switches or a duplex switch and controls a circuit for the solenoid 133 and also a circuit for the solenoid 134 (Figs. 6 and 13) that controls the one-revolution clutch 147. When this clutch operates through one revolution, it operates the plunger 125 to feed a definite measured quantity of crackers from the front of the stack on the belt 3 as best shown in Fig. 8. While these crackers are being pushed off, they are supported on the plate 204 which is attached to and forms a part of the plunger 125. When the crackers 293 (Fig. 8) being pushed off by the plunger 125 clear the head 126 of the follower, the latter immediately starts its return stroke toward the right which opens the switch 131 and de-energizes the two solenoids 133, 134. This operation continues until all of the crackers which have been fed to the belts 1 and 2 have been in turn fed to the belt 3 and pushed off in measured quantities by the pusher 125.

While we have illustrated and described our invention as being adapted for best use with a cracker packaging machine, it will be understood that it is not limited to that purpose but may be used for aligning, conveying, bunching and delivering many different articles. Another obvious use of the machine is as a bundling machine and in place of the conveyors 1, 2 and 3 carrying crackers or other articles, they may carry packages which will be grouped together and delivered in bundles of 6, 8, 12 or more by the pusher 125. It is now common practice in the baking industry to wrap small packages of biscuit and crackers in units of 6, 12 or more by other types of bundling machines. The present invention is well-adapted to do that type of work rapidly and inexpensively.

Having thus described one form of machine in which our invention may be embodied, we claim all modifications and equivalents thereof that may come within the scope or spirit of our claims.

What we claim is:

1. In a machine of the class described, the combination of an endless conveyor adapted to carry articles stacked on edge on its upper run, means for driving the conveyor continuously, rails adjacent the edges of the upper run of the conveyor over which the ends of the articles project, said rails normally being below the upper run, timing means in the path of the moving articles carried by the conveyor and adapted to be engaged and actuated by forward movement of the stacked articles, means controlled by said timing means when actuated by forward movement of said articles to lift said rails relative to the conveyor and raise the articles from the conveyor whereby the articles come to rest, and means controlled by said timing means to push a definite quantity of said articles laterally from the leading end of said stack of articles when at rest.

2. In a machine of the class described, the combination of an endless conveyor adapted to carry articles stacked on edge on its upper run, means for driving the conveyor continuously, rails adjacent the edges of the upper run of the conveyor over which the ends of the articles project, said rails normally being below the upper run, timing means in the path of the moving articles carried by the conveyor and adapted to be engaged and actuated by forward movement of the stacked articles, means controlled by said timing means when actuated by forward movement of said articles to lift said rails relative to the conveyor and raise the articles from the conveyor whereby the articles come to rest, means controlled by said timing means to push a definite quantity of said articles laterally from the leading end of said stack of articles when at rest, and means whereby lateral movement of said articles from the stack releases said timing means and actuates said control means to lower said rails.

3. In a machine of the class described, the combination of an endless conveyor adapted to carry articles stacked on edge on its upper run, means for driving the conveyor continuously, rails adjacent the edges of the upper run of the conveyor over which the ends of the articles project, said rails normally being below the upper run, timing means in the path of the moving articles carried by the conveyor and adapted to be engaged and actuated by forward movement of the stacked articles, means controlled by said timing means when actuated by forward movement of said articles to lift said rails relative to the conveyor and raise the articles from the conveyor whereby the articles come to rest, means controlled by said timing means to push a definite quantity of said articles laterally from the leading end of said stack of articles when at rest, and clamping means holding the next adjacent article in the stack against displacement while said quantity of articles is being pushed laterally.

4. In a machine of the class described, the combination of an endless delivery conveyor, a transfer plate adjacent the delivery end of the upper run thereof and adapted to receive articles therefrom, an endless receiving conveyor parallel to said first conveyor and having the receiving end of its upper run adjacent said transfer plate, means for driving said conveyors continuously, a pair of rails adjacent the edges of and normally below the upper run of each conveyor, the width of said conveyors being less than the length of the articles to be carried thereon whereby the ends of the articles will extend over said rails, means for raising and lowering said rails at times whereby said rails will lift the articles free from the conveyors, a timing device adjacent said transfer plate in the path of the articles delivered thereto from said delivery conveyor for controlling said raising and lowering means, said timing device being actuated by the articles delivered to said transfer plate to raise said rails when a pre-determined quantity of articles have been delivered to the plate whereby said articles come to rest, and means controlled by said timing device to push said quantity of articles on said transfer plate into alignment with said receiving conveyor while said rails are raised.

5. In a machine of the class described, the combination of an endless delivery conveyor, a transfer plate adjacent the delivery end of the upper run thereof and adapted to receive articles therefrom, an endless receiving conveyor parallel to said first conveyor and having the receiving end of its upper run adjacent said transfer plate, means for driving said conveyors continuously, a pair of rails adjacent the edges of and normally below the upper run of each conveyor, the width of said conveyors being less than the length of the articles to be carried thereon whereby the ends of the articles will extend over said rails, means for raising and lowering said rails at times whereby said rails will lift the articles free from the conveyors, a timing device adjacent said transfer plate in the path of the articles delivered thereto from said delivery conveyor for controlling said raising and lowering means, said timing device being actuated by the articles delivered to said transfer plate to raise said rails when a pre-determined quantity of articles have been delivered to the plate whereby said articles come to rest, means controlled by said timing device to push said quantity of articles from said transfer plate to said receiving conveyor while said rails are raised, means whereby the pushing of the articles from the transfer plate releases said timing device and lowers said rails, and a pusher engaging the rear one of each quantity of articles pushed onto the receiving conveyor and holding it from tilting backward until the next succeeding quantity is delivered.

6. In a machine of the class described, the combination of an endless conveyor adapted to carry stacked articles on its upper run, means for driving the conveyor, a plunger adapted to move transversely of the line of movement of the conveyor adjacent its delivery end, means for reciprocating the plunger in and out across the line of movement of the conveyor, a pusher adapted to move parallel to the conveyor, means for driving the pusher, holding means in the path of the plunger engaging the pusher and holding it against movement, means actuated by movement of the articles on the conveyor when a definite quantity of articles has been delivered in front of the plunger to cause the reciprocating means to move the plunger in and push the quantity of articles to said pusher, said plunger on its in-stroke releasing the pusher holding means.

7. In combination, an endless belt having upper and lower runs, means for driving said belt, said belt being adapted to receive a continuous row of stacked articles at one end of its upper run and deliver them at the other, a follower at the delivery end adapted to be engaged by the advancing articles and moved forward by them a distance equal to a pre-determined length of the stacked articles, means for arresting forward movement of the articles when the follower has been moved said pre-determined distance, a plunger movable transversely of the belt adjacent the delivery end and adapted to engage and move laterally said pre-determined length of articles from the forward end of the stack, and control means actuated by movement of said follower to actuate said arresting means and said plunger when said follower has been moved forward said definite distance by said articles.

8. In combination, an endless belt having upper and lower runs, means for driving said belt, said belt being adapted to receive a continuous row of articles stacked on edge at one end of its upper run and deliver them at the other, a follower at the delivery end adapted to be engaged by the advancing articles and moved forward by them a distance equal to a pre-determined length of the stacked articles, means for arresting forward movement of the articles when the follower has been moved said pre-determined distance, a plunger movable transversely of the belt adjacent the delivery end and adapted to engage and move laterally said pre-determined length of articles from the forward end of the stack, control means actuated by movement of said follower to actuate said arresting means and said plunger when said follower has been moved forward said definite distance by said articles, and clamping means engaging and holding the edges of the articles adjacent the quantity removed laterally from the stack by the plunger to prevent their falling over until the plunger returns.

9. In combination, two parallel endless conveyors each adapted to receive articles stacked on edge at one end and deliver them at the other end, the delivery end of one of said conveyors being in advance of the other, a transfer plate at the delivery end of each conveyor to receive the stacked articles from the respective conveyors, means to bring the measured quantities of articles from the heads of the stacks on the respective conveyors to rest on said transfer plates, a third endless conveyor having its path of travel parallel to and lying between the first two conveyors and its receiving end extending between said transfer plates, means for driving said conveyors continuously and the third conveyor at twice the speed of the first two, and means for simultaneously delivering said measured quantities from said transfer plates into alignment on said third conveyor.

10. In combination, two parallel endless conveyors each adapted to receive articles stacked on edge at one end and deliver them at the other end, the delivery end of one of said conveyors being in advance of the other, a third endless conveyor having its path of travel lying between the first two conveyors and its receiving end overlapping the delivery ends of the first two conveyors, means for driving said conveyors continuously and the third conveyor at twice the speed of the first two, a transfer plate at the delivery end of each of said first two conveyors adapted to receive articles from the respective conveyors, a pair of rails adjacent the edges of each conveyor and normally below the same, the stacked articles being wider than the conveyors and their ends extending over the rails, a follower overlying each transfer plate and adapted to be moved forward by the first article of the stack being delivered to each transfer plate, a plunger adjacent each transfer plate, lifting means adapted to lift said rails and the articles above the conveyors, means for reciprocating the plungers across the transfer plates toward and from the third conveyor, and control means actuated in part by said followers when carried forward a definite distance by the articles advancing across said transfer plates to actuate the lifting means to raise the rails and bring the articles to rest and to reciprocate said plungers to push definite quantities of the articles from the heads of the stacks on the transfer plates to the third conveyor.

11. In combination, two parallel endless conveyors each adapted to receive stacked articles at one end and deliver them at the other end, the delivery end of one conveyor being in advance of the other, a pusher having a plurality of spaced pusher fingers adapted to travel in a path between the two conveyors, means for driving the conveyors continuously, means whereby the pusher is driven intermittently, and means for simultoneously delivering measured quantities of articles from the heads of the stacks of articles on the delivery ends of the conveyors to the pusher between two fingers thereof while the pusher is stationary.

12. In combination, two parallel endless conveyors each adapted to receive stacked articles at one end and deliver them at the other end, the delivery end of one conveyor being in advance of the other, a pusher having a plurality of spaced pusher fingers adapted to travel in a path between the two conveyors and having an intermittent motion, means for driving the conveyors continuously, means for simultaneously delivering measured quantities of articles from the heads of the stacks of articles on the delivery ends of the conveyors to the pusher between two fingers thereof while the pusher is stationary, and means for driving the pusher after it has received the measured quantity of articles a distance substantially equal to the length of the stacked articles delivered to it and again bringing it to rest.

13. In a machine of the class described, the combination of a pusher chain having one run adapted to travel in a horizontal path, means whereby said pusher chain is driven intermittently, pusher fingers attached to said chain, means to deliver stacked articles between adjacent fingers on the said run of the chain, when the chain is stationary, the length of the stack of articles being substantially equal to the space between adjacent fingers, said intermittent driving means including a stop interposed in the path of said fingers and adapted to be engaged by a finger to hold the chain stationary at times, means for releasing said stop upon delivery of said articles between adjacent fingers, and means for returning said stop to be engaged by the next succeeding finger and stop the chain whereby the chain will be advanced the distance between fingers at each operation.

14. In a machine of the class described, the combination of a pusher chain having one run adapted to travel in a horizontal path, means whereby said pusher chain is driven intermittently, pusher fingers attached to said chain, means to deliver stacked articles between adjacent fingers on the said run of the chain when the chain is stationary, the length of the stack of articles being substantially equal to the space between adjacent fingers, said intermittent driving means including a stop interposed in the path of said fingers and adapted to be engaged by a finger to hold the chain stationary at times, means for releasing said stop upon delivery of said articles between adjacent fingers, means for returning said stop to be engaged by the next succeeding finger and stop the chain whereby the rear finger engaging the articles will advance the articles the distance between adjacent fingers, said fingers being slidable toward and from said chain, an inclined track adjacent said chain, and means on said fingers adapted to ride up on said inclined track as each finger approaches it and lift the finger at the head of the articles away from said articles.

15. In combination, an endless conveyor having upper and lower runs, the upper run being adapted to receive articles at one end and to deliver the articles at the other end, means for driving the conveyor continuously, rails adjacent the edges of the said upper run and normally below the level thereof, the articles extending beyond the edges of the conveyor and over the rails, levers for raising and lowering said rails, a solenoid for actuating said levers, a switch for controlling said solenoid, a follower in the path of the articles leaving the delivery end of said conveyor adapted to be engaged and moved by said advancing articles, and means on said follower for closing said switch and energizing said solenoid to raise said rails and lift the articles, from the conveyor when the follower has been moved a predetermined distance.

16. In combination, an endless conveyor having upper and lower runs, the upper run being adapted to receive articles at one end and to deliver the articles at the other end, means for driving the conveyor continuously, rails adjacent the edges of the said upper run and normally below the level thereof, the articles extending beyond the edges of the conveyor and over the rails, levers for raising and lowering said rails, a solenoid for actuating said levers, a switch for controlling said solenoid, a follower in the path of the articles leaving the delivery end of said conveyor adapted to be engaged and moved by said advancing articles, means on said follower for closing said switch and energizing said solenoid to raise said rails and lift the articles from the conveyor when the follower has been moved a predetermined distance, a transfer plate adjacent the delivery end of the conveyor to receive articles therefrom, a plunger adapted to operate across said transfer plate and push the articles therefrom, a clutch for driving said plunger, a solenoid controlling said clutch, and a switch for controlling said clutch solenoid, said follower closing said clutch solenoid switch simultaneously with the closing of said first named switch.

17. In combination, an endless conveyor having upper and lower runs, the upper run being adapted to receive articles at one end and to deliver the articles at the other end, means for driving the conveyor continuously, rails adjacent the edges of the said upper run and normally below the level thereof, the articles extending beyond the edges of the conveyor and over the rails, levers for raising and lowering said rails, a transfer plate adjacent the delivery end of the conveyor to receive articles therefrom, a follower extending over said transfer plate in the path of the articles and adapted to be engaged and moved forward by the advancing articles, a plunger adapted to operate across said transfer plate and push the articles therefrom, a clutch for driving said plunger, a latch normally holding said clutch inoperative, and means actuated by said follower when moved a predetermined distance by said advancing articles to operate said levers to raise the rails and articles above the conveyor and to release the plunger operating clutch, whereby the articles will come to rest and the plunger will push a definite quantity of articles laterally from the head of the stack of articles on the transfer plate.

18. In combination, an endless conveyor having upper and lower runs, the upper run being adapted to receive articles at one end and to deliver the articles at the other end, means for driving the conveyor continuously, rails adjacent the edges of the said upper run and normally below the level thereof, the articles extending beyond the edges of the conveyor and over the rails, levers for raising and lowering said rails, a transfer plate adjacent the delivery end of the conveyor to receive articles therefrom, a follower extending over said transfer plate in the path of the articles and adapted to be engaged and moved forward by the advancing articles, a plunger adapted to operate across said transfer plate and push the articles therefrom, a clutch for driving said plunger, a latch normally holding said clutch inoperative, means actuated by said follower when moved a predetermined distance by said advancing articles to operate said levers to raise the rails and articles above the conveyor and to release the plunger operating clutch, whereby the articles will come to rest and the plunger will push a definite quantity of articles laterally from the head of the stack of articles on the transfer plate, and means for returning the follower as soon as the plunger has pushed the articles from the head of the stack, the plunger having an opening through which the follower may return into engagement with the head of the remaining articles.

19. In combination, an endless conveyor having upper and lower runs, the upper run being adapted to receive articles at one end and to deliver the articles at the other end, means for driving the conveyor continuously, rails adjacent the edges of the said upper run and normally below the level thereof, the articles extending beyond the edges of the conveyor and over the rails, levers for raising and lowering said rails, a solenoid for actuating said levers, a switch for controlling said solenoid, a follower in the path of the articles leaving the delivery end of said conveyor adapted to be engaged and moved by said advancing articles, means on said follower for closing said switch and energizing said solenoid to raise said rails and lift the articles from the conveyor when the follower has been moved a predetermined distance, a transfer plate adjacent the delivery end of the conveyor to receive articles therefrom, a plunger adapted to operate across said transfer plate and push the articles therefrom, a clutch for driving said plunger, a solenoid controlling said clutch, a switch for controlling said clutch solenoid, said follower closing said clutch solenoid switch simultaneously with the closing of said first named switch, and means for returning the follower as soon as the plunger has pushed the articles from the head of the stack, the plunger having an opening through which the follower may return, the return of the follower opening the two solenoid control switches.

20. In combination, two parallel endless conveyors each adapted to receive articles stacked on edge at one end and deliver them at the other end, the delivery end of one of said conveyors being in advance of the other, a third endless conveyor having its path of travel lying between the first two conveyors and its receiving end being adjacent the delivery ends of the first two conveyors, means for driving said conveyors continuously and the third conveyor at twice the speed of the first two, a transfer plate at the delivery end of each of said first two conveyors adapted to receive articles from the respective conveyors, means for simultaneously delivering measured quantities of articles from said transfer plates to said third conveyor, and means whereby forward movement of the articles on said conveyors times and controls the operation of said delivery means.

21. In combination, two parallel endless conveyors each adapted to receive articles stacked on edge at one end and deliver them at the other end, the delivery end of one of said conveyors being in advance of the other, a transfer plate at the delivery end of each of said two conveyors adapted to receive articles from the respective conveyors, a third endless conveyor having its path of travel lying between the first two conveyors and its receiving end between the transfer plates, means for driving said conveyors continuously and the third conveyor at twice the speed of the first two, means for simultaneously delivering measured quantities of articles from said transfer plates to said third conveyor, means for delivering measured quantities of said articles from the delivery end of said third conveyor simultaneously with the delivery of articles to its receiving end, and means whereby forward movement of the articles on the respective conveyors times and controls the operation of the respective delivery means.

EUGENE S. TASCHER.
WILLIAM BAZANT.